US011281703B1

(12) United States Patent
Aitchison

(10) Patent No.: US 11,281,703 B1
(45) Date of Patent: Mar. 22, 2022

(54) SYSTEM AND METHODS FOR PROVIDING COMPUTER-RELATED SUPPORT

(71) Applicant: Ivanti, Inc., South Jordan, UT (US)

(72) Inventor: Ian Aitchison, Farnham (GB)

(73) Assignee: Ivanti, Inc., South Jordan, UT (US)

( * ) Notice: Subject to any disclaimer, the term of this patent is extended or adjusted under 35 U.S.C. 154(b) by 248 days.

(21) Appl. No.: 14/853,788

(22) Filed: Sep. 14, 2015

(51) Int. Cl.
*G06F 16/00* (2019.01)
*G06F 16/332* (2019.01)
*G06K 9/32* (2006.01)
*G06K 9/00* (2022.01)

(52) U.S. Cl.
CPC ....... *G06F 16/332* (2019.01); *G06K 9/00671* (2013.01); *G06K 9/325* (2013.01)

(58) Field of Classification Search
CPC ............ G06F 17/30637; G06F 16/332; G06K 9/00671; G06K 9/325
See application file for complete search history.

(56) References Cited

U.S. PATENT DOCUMENTS

| | | | |
|---|---|---|---|
| 7,757,126 B2* | 7/2010 | Vidiyala | G06F 11/0748 714/26 |
| 8,179,809 B1* | 5/2012 | Eppstein | H04L 67/1002 370/252 |
| 8,821,274 B2 | 9/2014 | Lyons et al. | |
| 9,009,261 B2 | 4/2015 | Sharma | |
| 9,037,572 B2 | 5/2015 | Jones et al. | |
| 2008/0150677 A1* | 6/2008 | Arakawa | B60R 25/2018 340/5.2 |
| 2010/0017589 A1* | 1/2010 | Reed | G06Q 20/123 713/2 |
| 2010/0042710 A1* | 2/2010 | Lin | H04L 41/00 709/222 |
| 2010/0055656 A1 | 3/2010 | Lemmers | |
| 2012/0004974 A1* | 1/2012 | Burger | G06Q 30/02 705/14.27 |
| 2012/0131416 A1 | 5/2012 | Dungan et al. | |
| 2013/0114100 A1* | 5/2013 | Torii | H04N 1/00344 358/1.14 |
| 2014/0032746 A1* | 1/2014 | Saxena | H04L 43/04 709/224 |
| 2014/0082430 A1 | 3/2014 | Bartlett et al. | |
| 2014/0089466 A1* | 3/2014 | Iyer | G06Q 10/20 709/219 |
| 2014/0237304 A1 | 8/2014 | Lai et al. | |
| 2015/0032669 A1* | 1/2015 | Winnick | G06N 5/04 706/11 |
| 2015/0371455 A1* | 12/2015 | Abdel-Rahman | G06Q 10/20 701/29.1 |
| 2016/0344877 A1* | 11/2016 | Altamirano | H04N 1/00129 |
| 2017/0078109 A1* | 3/2017 | Han | H04L 12/2803 |

* cited by examiner

*Primary Examiner* — Usmaan Saeed
*Assistant Examiner* — David M Nafziger

(57) ABSTRACT

A method for providing computer-related support to an end user is described. The method includes receiving, from a mobile device, an image of a user-readable message that is displayed by a computing device. The method also includes identifying one or more solutions using text extracted from the image of the user-readable message. The method further includes sending the one or more solutions to the mobile device for display on the mobile device.

22 Claims, 7 Drawing Sheets

SYSTEM AND METHODS FOR PROVIDING COMPUTER-RELATED SUPPORT

TECHNICAL FIELD

The present disclosure generally relates to computers and computer-related technology. More specifically, the present disclosure relates to systems and methods for providing computer-related support to an end user.

BACKGROUND

The use of electronic devices has become increasingly prevalent in modern society. As the cost of electronic devices has declined and as the usefulness of electronic devices has increased, people are using them for a wide variety of purposes. For example, many people use electronic devices to perform work tasks as well as to seek entertainment. One type of an electronic device is a computer.

Computer technologies continue to advance at a rapid pace. Computers commonly used include everything from hand-held computing devices to large multi-processor computer systems. These computers include software operating systems and applications that include user interfaces, in order to make them useful and accessible to an end user. Computers are increasingly linked with other computers through networks. With the expansion of computer technology, the size of networks has continued to increase. Networks may link computers together that are a great distance apart.

One of the challenges involved with computers is receiving computer-related support. A computing device may generate and display a notification, warning or error message. An end user may desire advice or guidance on how to respond to the displayed message. Typically, this would involve phone calls or emails with a technical support individual. As can be observed from this discussion, systems and methods that make computer-related support more time efficient and less burdensome may be beneficial to the end user and the management of a computer network.

DETAILED DESCRIPTION

Figure 1:
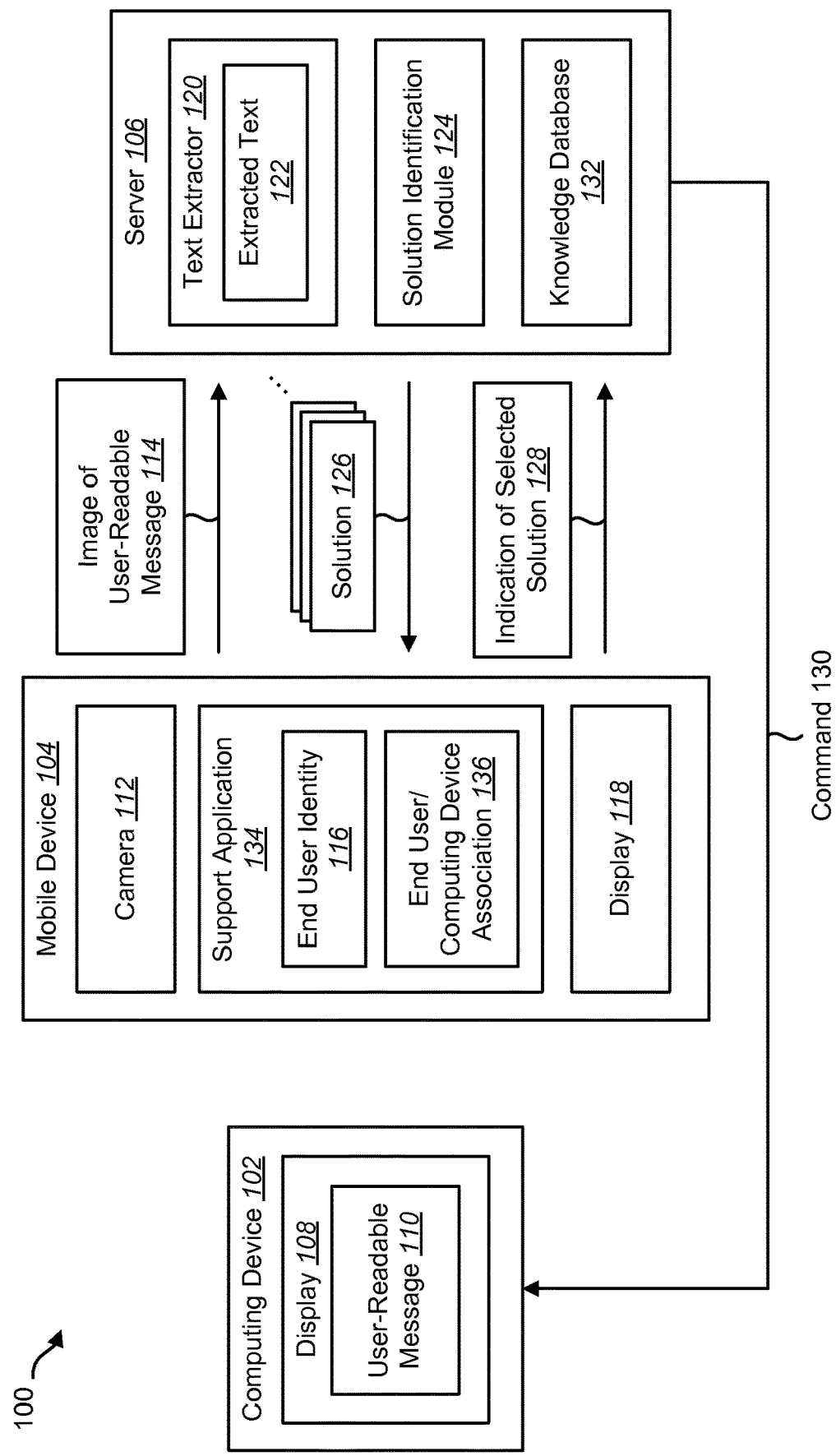
FIG. 1 is a block diagram illustrating one configuration of a system for providing computer-related support to an end user.

A method for providing computer-related support to an end user is described. The method includes receiving, from a mobile device, an image of a user-readable message that is displayed by a computing device. The method also includes identifying one or more solutions using text extracted from the image of the user-readable message. The method further includes sending the one or more solutions to the mobile device for display on the mobile device.

The method may also include implementing a selected solution on the computing device upon receiving an indication of the selected solution from the mobile device. Implementing one of the solutions on the computing device may include sending a command to the computing device in response to receiving the indication of the selected solution.

Identifying the one or more solutions using the text extracted from the image may include performing optical character recognition on the image of the user-readable message to extract the text. A knowledge database may be searched using the extracted text.

The one or more solutions may be further identified based on an association of the computing device with the end user. The one or more solutions may be further identified based on an end user identity such that more technical users receive more technical solutions.

At least one of the one or more solutions may provide guidance to the end user on how to resolve an error on the computing device. The one or more solutions may include at least one of an audio file, a video file or an executable action.

The image of the user-readable message may be received from the mobile device using a web service. The user-readable message may be related to an event that stops the end user from using the computing device. The computing device may be one of a desktop computer, a laptop computer or a tablet computer.

A server that is configured for providing computer-related support to an end user is also described. The server includes a processor, memory in electronic communication with the processor, and instructions stored in the memory. The instructions are executable by the processor to receive, from a mobile device, an image of a user-readable message that is displayed by a computing device. The instructions are also executable to identify one or more solutions using text extracted from the image of the user-readable message. The instructions are further executable to send the one or more solutions to the mobile device for display on the mobile device.

Another method for providing computer-related support to an end user is also described. The method includes sending, to a server, an image of a user-readable message that is displayed by a computing device. The method also includes receiving, from the server, one or more solutions that are identified using text extracted from the image of the user-readable message. The method further includes displaying the one or more solutions.

The method may also include receiving an indication of a selected solution by the end user. The selected solution may be implemented on the computing device. Implementing the selected solution on the computing device may include sending the indication of the selected solution to the server. The server may send a command to the computing device in response to receiving the indication of the selected solution.

The method may also include sending, to the server, an association of the computing device with the end user. The one or more solutions may be further identified based on the association of the computing device with the end user.

The method may also include sending, to the server, an end user identity. The one or more solutions may be further identified based on the end user identity such that more technical users receive more technical solutions.

At least one of the one or more solutions may provide guidance to the end user on how to resolve an error on the computing device. The image of the user-readable message may be sent to the server using a web service.

A mobile device that is configured for providing computer-related support to an end user is also described. The mobile device includes a processor, memory in electronic communication with the processor, and instructions stored in the memory. The instructions are executable by the processor to send, to a server, an image of a user-readable message that is displayed on a screen of a computing device. The instructions are also executable to receive, from the server, one or more solutions that are identified using text extracted from the image of the user-readable message. The instructions are further executable to display the one or more solutions.

As indicated above, when an end user of a computing device is presented with a message on a computer screen (e.g., a pop up message, error message, warning, advice or general notification), the end user may desire further support for determining how to respond to the message. However, complex onscreen warnings and messages on computers take time to type and/or describe to assist in technical support. Frequently, computer end users cannot or do not obtain advice on messages that appear onscreen on computers because of the time taken to communicate and search for advice. Furthermore, onscreen messages that stop an end user from using a computer (for example, on startup or when crashing) cannot be captured or used to provide assistance until manually documented and manually typed.

As demonstrated, there is a need for systems and methods for providing computer-related support to an end user of a computing device. The described systems and methods provide computer-related support that uses visual information to search and present corporate advice from a known advice knowledgebase.

A user-readable message may be displayed on a computing device. An image of the message may be passed through an optical character recognition (OCR) conversion to extract text. The text is then passed through a knowledgebase to provide recommended results. The results of the search are shown to the end user to provide advice and guidance. Therefore, the described systems and methods allow the end user to use a mobile device to capture the message visible on the computing device, and then see advice presented from a central knowledgebase.

In one implementation, the described systems and methods may be used to provide support for error messages displayed on a computer screen. In another implementation, the described systems and methods may be used to provide support for any text (e.g., posters, printed text, small screen/LCD (printers), signs or labels, etc.). Aspects of the present disclosure will be described in relation to a computing network that includes various components for managing computing devices belonging to an enterprise and components that cross multiple enterprises.

Various configurations of the systems and methods are now described with reference to the Figures, where like reference numbers may indicate identical or functionally similar elements. The configurations of the present systems and methods, as generally described and illustrated in the Figures herein, could be arranged and designed in a wide variety of different configurations. Thus, the following more detailed description of several configurations, as represented in the Figures, is not intended to limit the scope of the systems and methods, as claimed, but is merely representative of the various configurations of the systems and methods.

FIG. 1 is a block diagram illustrating one configuration of a system 100 for providing computer-related support to an end user. The system 100 may include one or more of a computing device 102 and a mobile device 104. The computing device 102 and the mobile device 104 may communicate with a server 106.

The computing device 102 may be a desktop computer, laptop computer, tablet computer, smartphone, printer, etc. The computing device 102 may include a display 108. The display 108 may be included within the computing device 102 (e.g., a touchscreen) or may be separate from (e.g., an external monitor) the computing device 102.

While using the computing device 102, an end user may encounter a user-readable message 110 that is displayed on the display 108 of the computing device 102. The user-readable message 110 may be an electronic message that is generated by the computing device 102 and presented on the display 108. Examples of the user-readable message 110 include a pop-up message, error message, warning, advice or general notification. For example, when an end user encounters a problem during an attempt to log into the computing device 102, the computing device 102 may display an error message. In another example, when a system administrator attempts to install software on the computing device 102, the system administrator may be presented with a message relating to a problem with the installation process. In yet another example, an end user may attempt to use an unlicensed program on the computing device 102, which may generate a message 110 on the display 108 of the computing device 102.

In some cases, the user-readable message 110 may be related to an event that stops the end user from using the computing device 102. For example, if the end user cannot log into the computing device 102, the end user is prevented from further using the computing device 102. In another example, in the event of a system crash, the computing device 102 may display a user-readable message 110, but may otherwise be locked up.

In other cases, the end user may be presented with the user-readable message 110, but is still able to use the computing device 102. For instance, in the example of a system administrator performing a software installation, the system administrator may be able to continue to use the computing device 102 after receiving the user-readable message 110 even if the software installation is suspended or cancelled.

In these scenarios, it may be beneficial to provide technical support to the end user. Typically, an end user may communicate with (e.g., call, chat, email) a support center to obtain assistance. However, an end user may be discouraged from seeking out or receiving support for a number of reasons. For example, complex onscreen warnings and messages on the computing device 102 may take time to type or describe to a technical support assistant. Therefore, end users may not obtain advice on messages 110 that appear onscreen on the computing device 102 because of the complexity and time taken to communicate and search for advice. Additionally, onscreen messages 110 or errors that stop an end user from using the computing device 102 (e.g., on startup or when crashing) cannot be captured or used to provide assistance until manually documented and manually typed.

In some approaches, the computing device 102 may generate and display a matrix barcode, 2D bar code, quick response (QR) code or some other machine-readable code in the event of an error. An end user may scan these codes (using a camera-equipped device, for instance) to receive feedback on how to respond to these error messages. However, this approach is problematic. For instance, these codes are incomprehensible to a human end user and may not provide any context for the error. Furthermore, to generate these error codes, the computing device 102 requires additional software to be installed. Additionally, the error codes may only be generated in certain cases, which may not cover all situations when an end user may require support due to a message being displayed by the computing device 102. Therefore, systems and methods for providing computer-related support to an end user using a user-readable message 110 may be beneficial.

As described herein, an end user may use a mobile device 104 in communication with a server 106 to obtain computer-related support. Examples of a mobile device 104 include smartphones, laptop computers, tablet computers and wearable computing devices. The mobile device 104 may include a camera 112, a support application 134, and a display 118.

The support application 134 may be a program run on the mobile device 104 through which the end user may obtain computer-related support. The support application 134 may be a native (e.g., standalone) app or may run within a mobile browser. The end user may log into the support application 134 by automatically or manually entering user credentials (e.g., username and password). The support application 134 may store the end user identity 116. The support application 134 may establish a link with the server 106 based on the user credentials.

The mobile device 104 may capture an image 114 of the user-readable message 110. For example, the end user may aim the camera 112 at the display 108 of the computing device 102 to capture a digital image 114 of the user-readable message 110. As used herein, a user-readable message 110 is a message that is presented in a format that can be read by a human end user. The user-readable message 110 may include text messages. The user-readable message 110 may include a combination of words, symbols, numbers or letters. For example, the computing device 102 may display an error message. This error message may be in a human-readable format. Therefore, the image 114 of the user-readable message 110 may include the displayed text that is readable by the end user.

The mobile device 104 may communicate with the server 106 using one or more networks. For example, the mobile device 104 may communicate with the server 106 using one or more Local Area Networks (LANs), Wide Area Networks (WANs), Wireless Local Area Networks (WLANs), cellular networks, the Internet, etc. In an implementation, the server 106 may be part of a cloud-based architecture that provides web services to the mobile device 104.

The mobile device 104 may send the image 114 of the user-readable message 110 to the server 106. Upon receiving the image 114, the server 106 may identify one or more solutions 126 using text 122 extracted from the received image 114. In an implementation, the server 106 may include a text extractor 120, a solution identification module 124 and a knowledge database 132.

The text extractor 120 may process the image 114 and determine the text that is included in the user-readable message 110. In an implementation, the text extractor 120 may perform optical character recognition (OCR) on the image 114 to extract the text 122. The text extractor 120 may provide the extracted text 122 to the solution identification module 124.

The solution identification module 124 may identify one or more solutions 126 related to the user-readable message 110 using the extracted text 122. In an implementation, the solution identification module 124 may search a knowledge database 132 using the extracted text 122. For example, the solution identification module 124 may use a database search engine to query the knowledge database 132 using the extracted text 122. The knowledge database query may return the one or more solutions 126.

The knowledge database 132 may index different files that may be used to provide computer-related support. The knowledge database 132 may include authored articles; support processes (e.g., incidents, changes, etc.); software, hardware and other service information; documents (e.g., text, PDF, slides, images, audio files, video files); and executable actions.

The knowledge database query may return a certain number of solutions 126. The number of solutions 126 that are returned by the query may be configurable. In one implementation, the number of returned solutions 126 may be limited to, or ordered by, the most relevant solutions 126.

The one or more solutions 126 may provide advice related to the user-readable message 110. For example, a solution 126 may provide guidance to the end user on how to resolve an error on the computing device 102. A solution 126 may include text instructions for responding to the user-readable message 110. A solution 126 may also include at least one of an audio file, a video file or an executable action link related to the user-readable message 110. As used herein, an executable action link is a link presented to an end user. The executable action link may pass a request for something to be pushed out to the computer device 102. In other words, the executable action link may be a request for action to take place automatically on the computer device 102.

In an example, a solution 126 may be a link to a video providing step-by-step instructions for how to respond to the user-readable message 110. In another example, a solution 126 may be a link to an executable action that may be run by the computing device 102 to resolve a problem identified by the user-readable message 110.

The solution 126 may also include a more detailed description of the circumstances that may have generated the user-readable message 110. In other words, the solution 126 may provide context and background for the user-readable message 110. For example, if the user-readable message 110 includes a string of numbers and letters associated with an error, the one or more solutions 126 may include a detailed description of what the error message means, why the error has occurred and/or what next action is recommended.

In addition to the extracted text 122, the solutions 126 may be further identified based on additional criteria. In one implementation, the one or more solutions 126 may be identified based on an end user/computing device association 136. For example, the end user may be associated with one or more computing devices 102. One computing device 102 may be a default computing device 102 for the end user. The end user may also be associated with additional computing devices 102.

Using the end user/computing device association 136, the solution identification module 124 may determine solutions 126 that are directed toward the specific computing device 102 associated with the end user. In other words, the solutions 126 may be tailored for the computing device 102 of the end user. For example, the solution identification module 124 may consider the computing device 102 configuration (e.g., operating system, installed programs, licenses, network hardware, etc.) when identifying the one or more solutions 126 or applying the appropriate solution 126.

In another implementation, the one or more solutions 126 may be further identified based on the end user identity 116 such that more technical users receive more technical solutions 126. The mobile device 104 may provide the end user identity 116 to the server 106. The server 106 may determine the technical level (e.g., training, experience, permissions, etc.) of the end user. The solution identification module 124 may identify the one or more solutions 126 by considering the technical level of the end user. Less technical users may receive less technical (e.g., simple) solutions 126, while more technical users may receive more technical (e.g., complex) solutions 126.

The server 106 may send the one or more solutions 126 to the mobile device 104. Upon receiving the one or more solutions 126, the mobile device 104 may display the one or more solutions 126 on its display 118. At this point, the end user is provided with support for the user-readable message 110 displayed on the computing device 102. For example, the end user may obtain guidance on how to resolve an error on the computing device 102. In the case of a text-based solution 126, the end user may read the instructions provided in the solution 126. Multi-media-based solutions 126 (e.g., images, audio, video), may be displayed or opened by a media player on the mobile device 104.

In an implementation, the displayed solutions 126 may be selectable by the end user. For example, a summary of the one or more solutions 126 may be initially displayed and the end user may select a link to a specific solution 126 to receive more information. For a solution 126 that includes an audio, video or executable action, the end user may select a link to the file, which may be opened by the mobile device 104. For example, an audio or video player may play the selected file.

In another implementation, the solution 126 may be a link to an executable action. The server 106 may implement a selected solution 126 on the computing device 102 upon receiving an indication 128 of the selected solution 126. In one approach, when an end user selects a solution 126, the mobile device 104 may send the indication 128 of the selected solution 126 to the server 106. The server 106 may send a command 130 to the computing device 102 in response to receiving the indication 128. The command 130 may be one or more instructions that may be executed by the computing device 102. For example, the selected solution 126 may be for remote assistance to log into the computing device 102. Upon receiving the selected solution indication 128, the server 106 may send a command 130 to log the end user into the computing device 102. Alternatively, the server 106 may send a command 130 to the computing device 102 to resolve the problem that is preventing the end user from logging in.

In another aspect, the server 106 may update the knowledge database 132 based on the received image 114 and/or the selected solution 126. Therefore, the server 106 may build the knowledge database 132 from other image/searches that take place over time. Use of this tool also updates the knowledge searched to improve the content and accuracy or the results.

In another implementation, the described systems and methods may be used to provide support for any user-readable text (e.g., posters, printed text, small screen/LCD (printers), signs, labels, etc.). For example, an end user may capture an image 114 of the user readable text using the mobile device 104 and may provide the image 114 to the server 106. The server 106 may extract the text from the image and perform a search of the knowledge database 132 to determine solutions 126 or advice for the user-readable text. These solutions/advice may be sent back to the mobile device 104 for display to the end user. It should be noted that in this implementation, the user-readable text may or may not be displayed by a computing device 102.

The described systems and methods may enable the system 100 to operate more securely and efficiently. The described systems and methods offer an enterprise the ability to capture visual information, search, and present corporate advice from a known advice knowledgebase. Further, the systems and methods described may provide convenient computer-related support to the end user of the computing device 102. The end user does not have to type or describe complex messages 110 to receive assistance. Additionally, a selected solution 126 may be automatically implemented by the server 106 on the computing device 102, or passed from the server 106 to other management tools that push the solution 126 out to the computing device 102, further enhancing the support offered to the end user.

Figure 2:
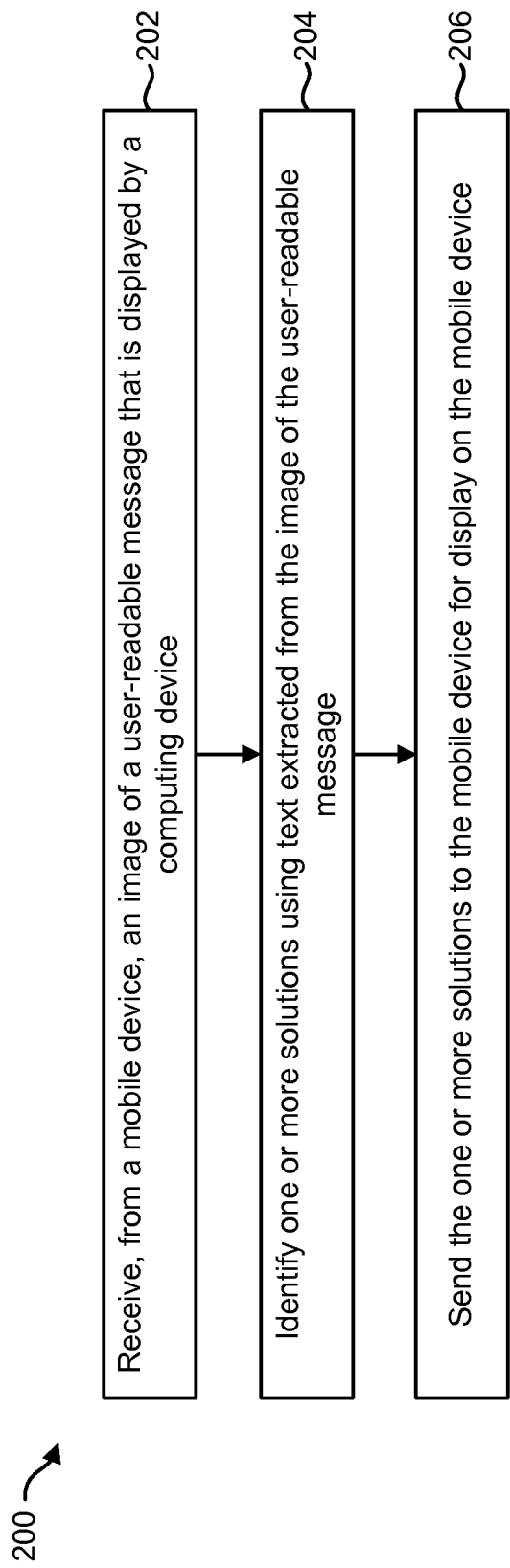
FIG. 2 is a flow diagram illustrating one configuration of a method for providing computer-related support to an end user.

FIG. 2 is a flow diagram illustrating one configuration of a method 200 for providing computer-related support to an end user. The method 200 may be implemented by a server 106. The server 106 may receive 202 an image 114 of a user-readable message 110 that is displayed by a computing device 102 from a mobile device 104. The computing device 102 may be a desktop computer, laptop computer, tablet computer, smartphone, printer, etc.

The user-readable message 110 may be an electronic message that is generated by the computing device 102. For example, the user-readable message 110 may be an error message displayed on a display 108 of the computing device 102. The user-readable message 110 may include a combination of words, symbols, numbers or letters. The user-readable message 110 may be in a human-readable format.

A mobile device 104 may capture an image 114 of the user-readable message 110. For example, the mobile device 104 may include a camera 112 that captures a digital image 114 of the user-readable message 110. The end user may use the mobile device 104 to capture an image 114 of the message 110 displayed by the computing device 102. The mobile device 104 may send the image 114 to the server 106.

The server 106 may identify 204 one or more solutions 126 using text 122 extracted from the image 114 of the user-readable message 110. The server 106 may process the image 114 and determine the text 122 that is included in the user-readable message 110. The server 106 may perform optical character recognition (OCR) on the image 114 to extract text 122 (e.g., numbers, letters, words and/or symbols).

The server 106 may search a knowledge database 132 using the extracted text 122. For example, the server 106 may use a database search engine to query a knowledge database 132 using the extracted text 122. The knowledge database query may return the one or more solutions 126. The one or more solutions 126 may provide advice related to the user-readable message 110. For example, a solution 126 may provide guidance to the end user on how to resolve an error on the computing device 102.

The server 106 may send 206 the one or more solutions 126 to the mobile device 104. Upon receiving the one or more solutions 126, the mobile device 104 may display the one or more solutions 126 on its display 118. At this point, the end user is provided with support for the user-readable message 110 displayed on the computing device 102. For example, the end user may select one of the solutions 126 to receive step-by-step instructions on how to resolve an error message.

Figure 3:
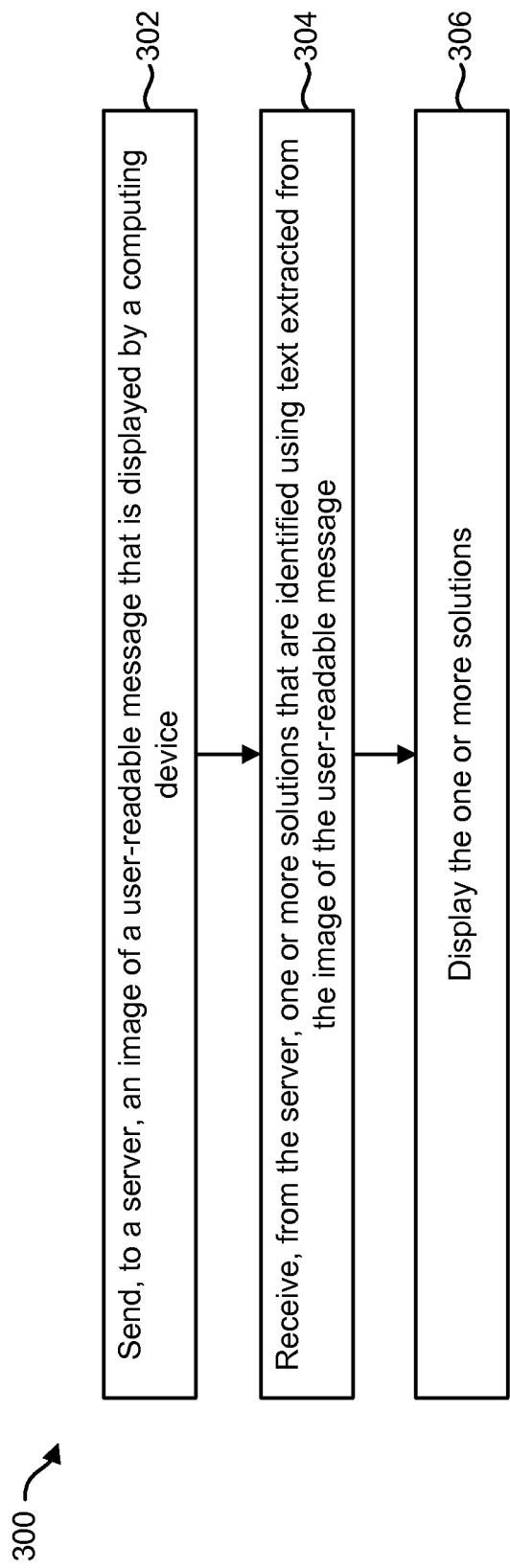
FIG. 3 is a flow diagram illustrating another configuration of a method for providing computer-related support to an end user.

FIG. 3 is a flow diagram illustrating another configuration of a method 300 for providing computer-related support to an end user. The method 300 may be implemented by a mobile device 104. Examples of a mobile device include smartphones, laptop computers and tablet computers.

The mobile device 104 may send 302 an image 114 of a user-readable message 110 that is displayed by a computing device 102. As described above, the user-readable message 110 may include a combination of words, symbols, numbers or letters that are readable by a human end user. For example, the computing device 102 may display an error message. This error message may be in a human-readable format.

The mobile device 104 may capture the image 114 of the user-readable message 110. For example, the mobile device 104 may include a camera 112 that captures a digital image 114 of the user-readable message 110.

The mobile device 104 may send 302 the image 114 to a server 106. For example, the mobile device 104 may send 302 the image 114 to the server 106 using one or more Local Area Networks (LANs), Wide Area Networks (WANs), Wireless Local Area Networks (WLANs), cellular networks, the Internet, etc.

The mobile device 104 may receive 304 one or more solutions 126 that are identified using text 122 extracted from the image 114 of the user-readable message 110. In an implementation, the server 106 may perform optical character recognition (OCR) on the image 114 to extract text 122 (e.g., numbers, letters, words and/or symbols). The server 106 may search a knowledge database 132 using the extracted text 122. The knowledge database query may return the one or more solutions 126.

The mobile device 104 may display 306 the one or more solutions 126 on its display 118. At this point, the end user is provided with support for the user-readable message 110 displayed on the computing device 102. The end user may select one of the one or more solutions 126 for further information. For example, upon selecting a solution 126, the mobile device 104 may present additional information (e.g., text, audio, video) related to the message 110. Additionally, the end user may select a solution 126 that causes the server 106 to send a command 130 to the computing device 102.

Figure 4:
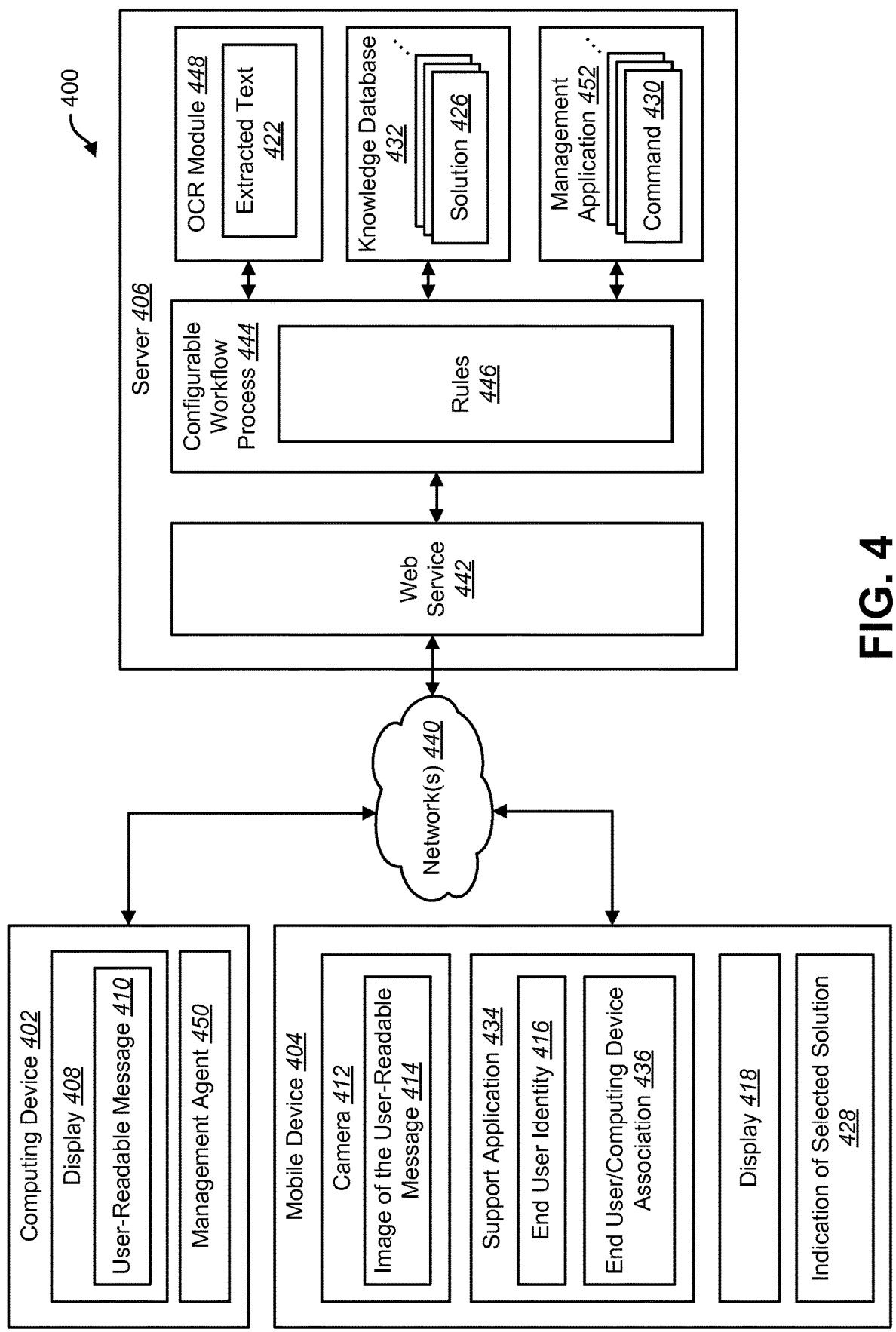
FIG. 4 is a block diagram illustrating another configuration of a system for providing computer-related support to an end user.

FIG. 4 is a block diagram illustrating another configuration of a system 400 for providing computer-related support to an end user. The system 400 may include a computing device 402, a mobile device 404 and a server 406. The computing device 402, mobile device 404 and server 406 may be similar to the computing device 102, mobile device 104 and server 106 described in connection with FIG. 1, respectively.

The computing device 402 and the mobile device 404 may communicate with a server 406 via one or more network(s) 440. The network(s) 440 may include one or more Local Area Networks (LANs), Wide Area Networks (WANs), Wireless Local Area Networks (WLANs), cellular networks, the Internet, etc. While a single network 440 is illustrated in FIG. 4, the computing device 402 and the mobile device 404 may communicate with the server 406 using the same network 440 or different networks 440. For example, the computing device 402 may communicate with the server 406 using a LAN and the mobile device 404 may communicate with the server 406 using a cellular network.

The computing device 402 may include a display 408 and a management agent 450. In an implementation, the management agent 450 may include executable code for performing one or more operations. For example, the management agent 450 may be an application (e.g., program) running on the computing device 402. In some cases, the management agent 450 may perform management-related tasks in response to requests from a management application 452 of the server 406.

In some configurations, the management agent 450 may be capable of running in a pre-boot environment. For example, the management agent 450 may operate without an operating system installed and/or running on the computing device 402. Accordingly, the management agent 450 may perform operations before an operating system has been installed and/or booted on the computing device 402. The management agent 450 may also operate with an operating system installed and/or booted on the computing device 402.

The computing device 402 may display a user-readable message 410. As described above, the computing device 402 may display a user-readable message 410 on the display 408. For example, the user-readable message 410 may be an error message.

The mobile device 404 may include a support application 434. The support application 434 may be a native app or may be run by a mobile browser. The end user may log into the support application 434. The support application 434 may store an end user identity 416 and an end user/computing device association 436, which may be supplied to the server 406 via the network 440 connection.

The end user may use the support application 434 to receive computer-related support from the server 406. The support application 434 may access the camera 412 of the mobile device 404 to capture an image 414 of the user-readable message 410. For example, the end user may use the user interface of the support application 434 to take a picture of the user-readable message 410. The support application 434 may save the image 414 and send the image 414 to the server 406.

The server 406 may include a web service 442, a configurable workflow process 444, an optical character recognition (OCR) module 448, a knowledge database 432 and a management application 452. The web service 442 may establish a connection with the mobile device 404 via the network 440. For example, the web service 442 may be a cloud-based service with which the mobile device 404 communicates. The web service 442 may receive the image 414 from the mobile device 404. The web service 442 may provide the image 414 to the configurable workflow process 444.

The configurable workflow process 444 may use rules 446 to identify solutions 426 in response to receiving an image 414 from the mobile device 404. For example, the rules 446 may control when and how the image 414 is captured, the text 422 extracted and the solution search performed.

Upon receiving the image 414, the configurable workflow process 444 may provide the image 414 to the OCR module 448. The OCR module 448 may perform optical character recognition on the image 414 to extract text 422. The OCR module 448 may return the extracted text 422 to the configurable workflow process 444.

The configurable workflow process 444 may provide the extracted text 422 to the knowledge database 432. The knowledge database 432 may be searched using the extracted text 422. For example, the knowledge database 432 may be queried using the extracted text 422. The knowledge database query may return one or more solutions 426.

In an implementation, the configurable workflow process 444 may also use additional criteria when identifying the one or more solutions 426. The configurable workflow process 444 may further identify the one or more solutions 426 based on an end user/computing device association 436 and/or an end user identity 416. This may be accomplished as described in connection with FIG. 1.

The server 406 may send the one or more solutions 426 to the mobile device 404. Upon receiving the one or more solutions 426, the mobile device 404 may display the one or more solutions 426 on its display 418. The end user may then view or listen to one or more solutions 426 to obtain guidance on how to respond to the message 410.

In an implementation, the end user may select a solution 426 that includes a link to an executable action. In this case, the mobile device 404 may send an indication 428 of the selected solution 426 back to the server 406.

A management application 452 of the server 406 may receive the indication 428. The management application 452 may interact with the management agent 450 of the computing device 402 to perform management-related tasks. The management application 452 may issue one or more commands 430 to the computing device 402 in response to receiving the indication 428 from the mobile device 404.

Figure 5:
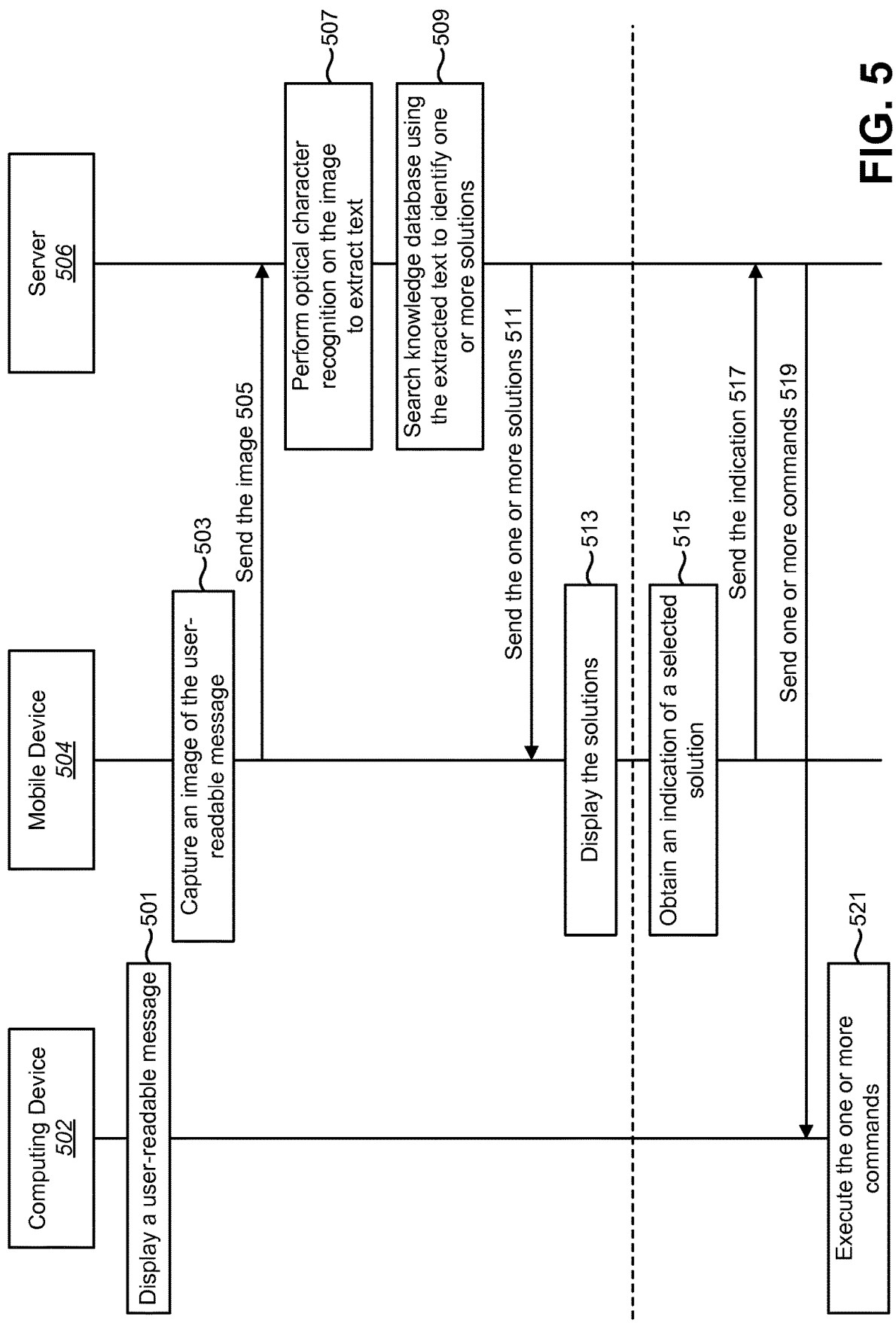
FIG. 5 is a sequence diagram illustrating various operations that may be performed by a mobile device and a server to provide computer-related support to an end user of a computing device.

FIG. 5 is a sequence diagram illustrating various operations that may be performed by a mobile device 504 and a server 506 to provide computer-related support to an end user of a computing device 502. The computing device 502 may display 501 a user-readable message 110. For example, the computing device 502 may display 501 a pop-up message, error message, warning, advice or general notification.

The mobile device 504 may capture 503 an image 114 of the user-readable message 110. For example, the mobile device 504 may include a camera 112 that captures a digital image 114 of the message 110. The mobile device 504 may send 505 the image 114 to the server 506.

Upon receiving the image 114, the server 506 may perform 507 optical character recognition (OCR) to extract text 122 from the image 114. The server 506 may search 509 a knowledge database 132 using the extracted text 122 to identify one or more solutions 126. The server 506 may send 511 the one or more solutions 126 to the mobile device 504.

Upon receiving the one or more solutions 126, the mobile device 504 may display 513 the one or more solutions 126. The end user may view or listen to one or more of the solutions 126 to obtain guidance on how to respond to the message 110.

The end user may (optionally) select a solution 126 that includes a link to an executable action. In this case, the mobile device 504 may obtain 515 an indication 128 of the selected solution 126. The mobile device 504 may send 517 the indication 128 of the selected solution 126 to the server 506. In response to the indication 128, the server 506 may send 519 one or more commands 130 to the computing device 502, which may execute 521 the one or more commands 130.

Figure 6:
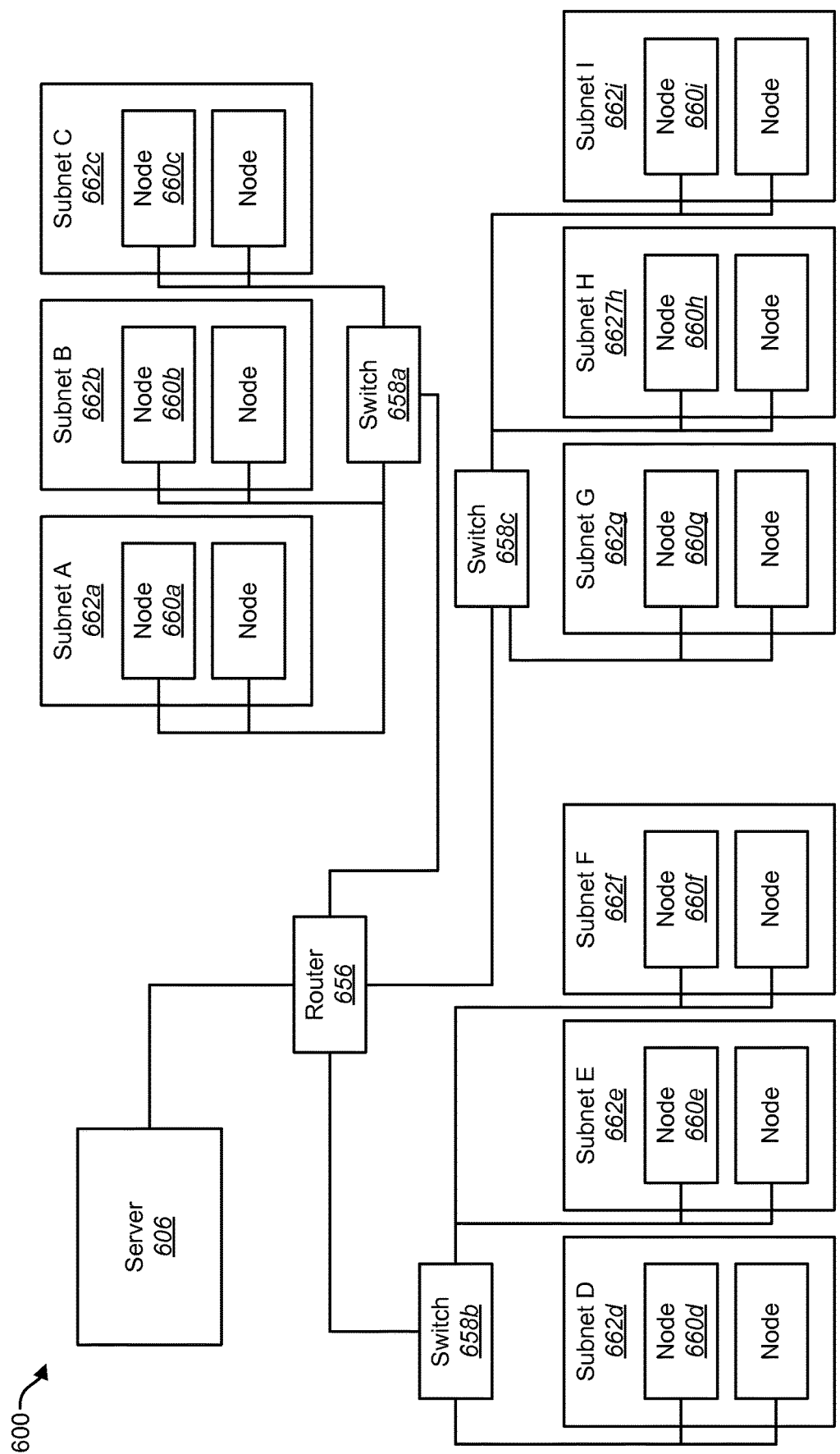
FIG. 6 is a block diagram that illustrates one configuration of a network where systems and methods for providing computer-related support to an end user.

FIG. 6 is a block diagram that illustrates one configuration of a network 600 where systems and methods for providing computer-related support to an end user may be implemented. A server 606 is connected to a router 656. The router 656 is connected to switches 658a, 658b, and 658c. The switch 658a is connected to several nodes 660a, 660b, 660c, etc., via their respective subnets 662a, 662b, and 662c. The switch 658b is connected to several nodes 660d, 660e, 660f, etc., via their respective subnets 662d, 662e, and 662f. The switch 658c is connected to several nodes 660g, 660h, 660i, etc., via their respective subnets 662g, 662h, 662i. Although FIG. 6 only shows one router 656, and a limited number of switches 658, subnets 662 and nodes 660, many and varied numbers of routers 656, switches 658, subnets 662 and nodes 660 may be included in networks and/or systems that may implement systems and methods for providing computer-related support to an end user. It should be noted that one or more of the nodes 660a-i may be examples of one or more of the computing devices 102, 402 and 502 or mobile device 104, 404 and 504 described herein.

Figure 7:
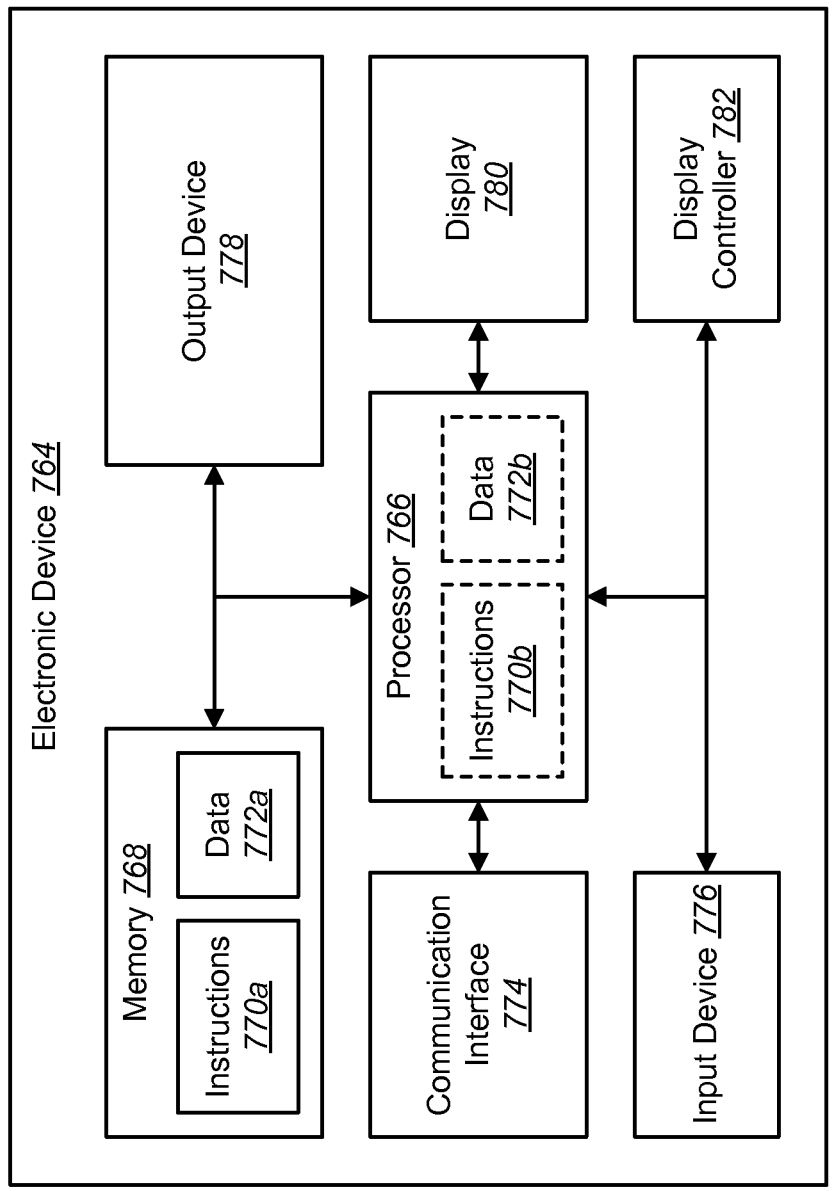
FIG. 7 illustrates various components that may be utilized in an electronic device.

FIG. 7 illustrates various components that may be utilized in an electronic device 764. The electronic device 764 may be configured in accordance with one or more of the computing devices 102, 402, 502, mobile devices 104, 404, 504 and servers 106, 406, 506 described herein.

The electronic device 764 may include a processor 766 and memory 768. The memory 768 may include instructions 770a and data 772a. The processor 766 controls the operation of the electronic device 764 and may be, for example, a microprocessor, a microcontroller, a digital signal processor (DSP) or other device known in the art. The processor 766 typically performs logical and arithmetic operations based on program instructions 770b and/or data 772b received from the memory 768.

The electronic device 764 typically may include one or more communication interfaces 774 for communicating with other electronic devices. The communication interfaces 774 may be based on wired communication technology, wireless communication technology or both. Examples of different types of communication interfaces 774 include a serial port, a parallel port, a Universal Serial Bus (USB), an Ethernet adapter, an IEEE bus interface, a small computer system interface (SCSI) bus interface, an infrared (IR) communication port, a Bluetooth wireless communication adapter and so forth.

The electronic device 764 typically may include one or more input devices 776 and one or more output devices 778. Examples of different kinds of input devices 776 include a keyboard, mouse, microphone, remote control device, button, joystick, trackball, touchpad, lightpen, etc. Examples of different kinds of output devices 778 include a speaker, printer, etc. One specific type of output device 778 that may be included in a computer system is a display device 780. Display devices 780 used with configurations disclosed herein may utilize any suitable image projection technology, such as liquid crystal display (LCD), light-emitting diode (LED), gas plasma, electroluminescence, a cathode ray tube (CRT) or the like.

A display controller 782 may also be provided, for converting data 772a stored in the memory 768 into text, graphics and/or moving images (as appropriate) shown on the display device 780. Of course, FIG. 7 illustrates only one possible configuration of an electronic device 764. Various other architectures and components may be utilized.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available non-transitory tangible medium that can be accessed by a computer or processor. By way of example, and not limitation, a computer-readable medium may comprise RAM, ROM, EEPROM, CD-ROM or other optical disk storage, magnetic disk storage or other magnetic storage devices, removable flash drives or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server or other remote source using a coaxial cable, fiber optic cable, twisted pair, digital subscriber line (DSL) or wireless technologies such as infrared, radio, and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described methods. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A method for providing computer-related support to an end user, the method comprising:
    receiving, at a server and from a support application running on a mobile device, an image of a complex user-readable message that is displayed by a computing device, wherein:
        the computing device displays the complex user-readable message in response to an event being experienced at the computing device that prevents an end user from using the computing device to obtain assistance related to the event, and
        the complex user-readable message is descriptive of the event on the computing device;
    determining a technical level of the end user, the technical level including a training, experience, and a permission of the end user;
    identifying, via the server, a plurality of user-selectable solutions that address the event based on text extracted from the image of the complex user-readable message, the technical level of the end user, and a configuration of the computing device, wherein the plurality of user-selectable solutions includes information of a link to request communication of a command to perform an automatically executable action that corrects the event on the computing device;
    sending a signal, by the server and to the mobile device, the signal being configured to cause display of the plurality of user-selectable solutions in the support application of the mobile device, the plurality of displayed user-selected solutions including the link to request communication of the command to perform with the executable action;
    receiving, at the server and from the mobile device, a signal that is indicative of a selection by the end user of the link in the support application; and
    responsive to the received signal indication of the selection at the mobile device, sending, by the server, the command to the computing device, the command including one or more program instructions, that when received by the computing device are automatically implemented on the computing device to correct the event and enable use of the computing device by the end user.

2. The method of claim 1, wherein identifying the plurality of user-selectable solutions based on the text extracted from the image comprises:
    performing optical character recognition on the image of the complex user-readable message to extract the text; and
    searching a knowledge database using the extracted text.

3. The method of claim 1, the plurality of user-selectable solutions is further identified based on an association of the computing device with the end user.

4. The method of claim 1, wherein identifying the plurality of user-selectable solutions is further based on an end user identity.

5. The method of claim 1, wherein
at least one of the plurality of user-selectable solutions provides guidance to the end user on how to resolve the event on the computing device.

6. The method of claim 1, wherein the plurality of user-selectable solutions further comprises at least one of an audio file or a video file.

7. The method of claim 1, wherein the computing device is one of a desktop computer, a laptop computer, a smartphone, a printer, or a tablet computer.

8. A server that is configured for providing computer-related support to a computing device of an end user, comprising:
a processor;
memory in electronic communication with the processor; and
instructions stored in the memory, the instructions being executable by the processor to:
receive, from a support application running on a mobile device, an image of a complex user-readable message that is displayed by a computing device, wherein: the computing device displays the complex user-readable message in response to an event being experienced at the computing device that prevents an end user from using the computing device to obtain assistance related to the event, and the complex user-readable message is descriptive of the event on the computing device;
determine a technical level of the end user, the technical level including a training, experience, and a permission of the end user;
identify a plurality of user-selectable solutions that address the event based on text extracted from the image of the complex user-readable message, the technical level of the end user, and a configuration of the computing device, wherein the plurality of user-selectable solutions includes information of a link to request communication of a command to perform an automatically executable action that corrects the event on the computing device;
send a signal to the mobile device, the signal being configured to cause display of the plurality of user-selectable solutions in the support application of the mobile device, the displayed plurality of user-selected solutions including the link to request communication of the command to perform with the executable action;
receive from the mobile device, a signal that is indicative of a selection by the end user of the link in the support application; and
responsive to the received signal indication of the selection at the mobile device, send the command to the computing device, the command including one or more program instructions, that when received by the computing device are automatically implemented on the computing device to correct the event and enable use of the computing device by the end user.

9. The server of claim 8, wherein the instructions executable to identify the plurality of user-selectable solutions based on the text extracted from the image comprise instructions executable to:
perform optical character recognition on the image of the complex user-readable message to extract the text; and
search a knowledge database using the extracted text.

10. The server of claim 8, wherein the plurality of user-selectable solutions is further identified based on an association of the computing device with the end user.

11. A method for providing computer-related support to a computer device of an end user, the method comprising:
receiving user credentials of the end user;
establishing a communication link with a server based on the user credentials;
receiving an image that is captured by a camera, the image including a complex user-readable message displayed by the computing device, wherein the computing device displays the complex user-readable message in response to an event being experienced at the computing device that prevents the end user from using the computing device to obtain assistance related to the event, and the complex user-readable message is descriptive of the event on the computing device;
sending, to the server via the communication link, the image of a complex user-read able message;
further sending, to the server via the communication link, an end user identity that includes information from which a technical level of the end user is determinable by the server;
receiving, from the server via the communication link, a signal that includes a plurality of user-selectable solutions that address the event, the plurality of user-selectable solutions including a link to request communication of a command to perform an automatically executable action that corrects the event on the computing device and the plurality of user-selectable solutions being identified based on text extracted from the image, the technical level of the end user, and a configuration of the computing device;
displaying the plurality of user-selectable solutions, the plurality of displayed user-selected solutions including the link to request communication of the command to perform the executable action;
receiving a selection by the end user of the selectable link; and
sending via the communication link a signal that indicates the selection of the link to the server such that in response to receipt of the signal the server sends the command to the computing device in response to receiving the indication, the command including one or more program instructions, that when received by the computing device are automatically implemented on the computing device to correct the event and enable use of the computing device by the end user.

12. The method of claim 11, further comprising:
sending, to the server, an association of the computing device with the end user,
wherein the plurality of user-selectable solutions is further identified based on the association of the computing device with the end user.

13. The method of claim 11, wherein at least one of the plurality of user-selectable solutions provides guidance to the end user on how to resolve an error on the computing device.

14. A mobile device that is configured for providing computer-related support to a computer device of an end user, the mobile device comprising:
a camera;
a processor in electronic communication with the camera;
memory in electronic communication with the processor and the camera; and
instructions stored in the memory, the instructions being executable by the processor to:
receive user credentials of the end user;
establish a communication link with a server based on the user credentials;

receive an image that is captured by the camera, the image including a complex user-readable message displayed the computing device, wherein the computing device displays the complex user-readable message in response to an event being experienced at the computing device that prevents the end user from using the computing device to obtain assistance related to the event, and the complex user-readable message is descriptive of the event on the computing device;

send, to the server via the communication link, the image of a complex user-readable message;

further send, to the server via the communication link, an end user identity that includes information from which a technical level of the end user is determinable by the server;

receive, from the server via the communication link, a signal that includes a plurality of user-selectable solutions that address the event, the plurality of user-selectable solutions including a link to request communication of a command to perform an automatically executable action that corrects the event on the computing device and the plurality of user-selectable solutions being identified based on text extracted from the image, the technical level of the end user, and a configuration of the computing device;

display the plurality of user-selectable solutions, the plurality of displayed user-selected solutions including the link to request communication of the command to perform the executable action;

receive a selection by the end user of the selectable link; and send via the communication link a signal that indicates the selection of the link to the server such that in response to receipt of the signal the server sends the command to the computing device in response to receiving the indication, the command including one or more program instructions that when received by the computing device are automatically implemented on the computing device to correct the event and enable use of the computing device by the end user.

15. The mobile device of claim 14, further comprising instructions executable to:

send, to the server, an association of the computing device with the end user, wherein the plurality of user-selectable solutions is further identified based on the association of the computing device with the end user.

16. The mobile device of claim 14, wherein at least one of the plurality of user-selectable solutions provides guidance to the end user on how to resolve an error on the computing device.

17. The method of claim 1, wherein the command includes at least one of:

a command to log an end user into the computing device; or a command to resolve a condition in which the end user cannot log into the computing device.

18. The method of claim 1, wherein:

the event includes a failure to boot or a crash of the computing device such that the computing device cannot be used to provide assistance related to the event; and the server is configured to communicate the command to the computing device via a management agent loaded on the computing device and capable of running in a pre-boot environment.

19. The method of claim 1, wherein the plurality of user-selectable solutions includes a configurable number of user-selectable solutions.

20. The server of claim 8, wherein the plurality of user-selectable solutions includes a configurable number of user-selectable solutions.

21. The method of claim 11, wherein the configuration of the computing device includes at least one of an operating system, an installed program, a license, or network hardware associated with the computing device.

22. The mobile device of claim 14, wherein the configuration of the computing device including at least one of an operating system, an installed program, a license, or network hardware associated with the computing device.

\* \* \* \* \*